United States Patent
Bosch

[15] 3,700,033
[45] Oct. 24, 1972

[54] HYDRAULIC SHOCK ABSORBER FOR LOOMS

[72] Inventor: Jose Bosch, Aragon 376, Barcelona, Spain

[22] Filed: March 16, 1970

[21] Appl. No.: 19,726

[30] Foreign Application Priority Data

March 25, 1969 Spain..........................765,708

[52] U.S. Cl..................................139/161, 188/288
[51] Int. Cl. .......................D03d 49/38, D03d 49/54
[58] Field of Search ...139/161 F, 161, 144; 188/288, 188/284, 316, 311, 322

[56] References Cited

UNITED STATES PATENTS

| 2,677,933 | 5/1954 | Hopkinson | 139/144 X |
| 2,649,118 | 8/1953 | Heath | 139/161 F |
| 2,498,022 | 2/1950 | Zarn | 139/161 F |
| 3,180,369 | 4/1965 | Leader et al. | 139/161 F |
| 3,175,818 | 3/1965 | Croucher | 188/288 X |

FOREIGN PATENTS OR APPLICATIONS

| 123,476 | 2/1959 | U.S.S.R. | 139/161 F |
| 888,485 | 1/1962 | Great Britain | 139/144 |
| 224,030 | 10/1962 | Austria | 139/161 F |
| 260,824 | 3/1968 | Austria | 139/161 F |
| 464,109 | 11/1968 | Switzerland | 139/161 F |

*Primary Examiner*—James Kee Chi
*Attorney*—Ernest G. Montague

[57] ABSTRACT

A hydraulic shock absorber for looms, comprising a cylinder bearing body, an oil compression rod slidably disposed within the cylinder bearing body, an elastic cap mounted on one end of the rod and adapted to receive the impact of a shuttle, and an oil tank connected the cylinder bearing body. Communicating channel means are provided between the cylinder bearing body to the tank, and the cylinder bearing body comprising a hollow tubular element having an outer surface including a smooth portion, the oil tank being formed with an opening in which the smooth portion of the tubular element is inserted for connection to the oil tank, the outer surface of the tubular element including a threaded portion for adjustable mounting on the loom, and a connical end cap closing the hollow tubular element, the latter being formed with a substantially inner right-angle step in which the connical end cap engages.

4 Claims, 9 Drawing Figures

HYDRAULIC SHOCK ABSORBER FOR LOOMS

The present invention relates to hydraulic shock absorbers for the shuttles of looms, in general, and to improvements therein by which substantial advantages are obtained as compared with those now known.

As is known, hydraulic shock absorbers for shuttles of looms fulfill their purpose of taking up the kinetic energy of the shuttle when it arrives at the end of its path, and having means to recover its working position immediately thereafter for a new cycle.

It is an object of the present invention to provide a hydraulic shock absorber for shuttles, and relating to improvement in various fundamental aspects of the operation of the shock absorber, one of which being the possibility of the supply of oil working at atmospheric pressure is achieved without the necessity of using compressed air within the tank for the purpose of braking or employing diaphragms or other devices, which permits much greater simplicity of the device and therefore greater dependability in operation. Furthermore, these improvements make possible the proper operation of the shock absorber even with a reduced level of liquid in the hydraulic oil receptacle.

It is another object of the present invention to provide a hydraulic shock absorber for shuttles of looms wherein movement of the rod takes place within an externally threaded cylinder provided with a lock nut which makes it possible to regulate the position of the shock absorber with respect to the loom, and permitting a satisfactory adjustment.

It is yet another object of the present invention to provide a hydraulic shock absorber for shuttles of looms, wherein the protection against the introduction of lint or other dirt in the guide path of the rod is obtained in a threefold manner which in practice assures the protection of the guided part of the sliding rod by providing a surrounding elastic outer sleeve which extends over the entire length of the springs, a sleeve of expanded polyurethane being preferably employed, supplemented by a felt washer on which the rod is guided and a retainer of special shape arranged beyond same.

It is yet still another object of the present invention to provide a hydraulic shock absorber for shuttles of looms, wherein the tank containing the hydraulic oil, which is made of preferably a welded, stamped metal plate and has an orifice passing therethrough in which there is engaged the cylinder which comprises a single piece of substantially cylindrical structure on its outside, the connection being effected preferably by welding. This arrangement permits a large saving in the manufacture of the hydraulic shock absorber.

It is still yet another object of the present invention to provide a hydraulic shock absorber for shuttles of looms comprising a cylinder bearing body, an oil compression rod slidably disposed within the cylinder bearing body, an elastic cap mounted on one end of the rod and adapted to receive the impact of a shuttle, and an oil tank connected to the cylinder bearing body. Communicating channel means are provided between the cylinder bearing body to the tank, and the cylinder bearing body comprising a hollow tubular element having an outer surface including a smooth portion, the oil tank being formed with an opening in which the smooth portion of the tubular element is inserted for connection to the oil tank, the outer surface of the tubular element including a threaded portion for adjustable mounting on the loom, and a conical end cap closing the hollow tubular element, the latter being formed with a substantially inner right-angle step in which the conical end cap engages.

With these and other objects in view which will become apparent in the following detailed description, the present invention will be clearly understood in connection with the accompanying drawings, in which.

Figure 1:
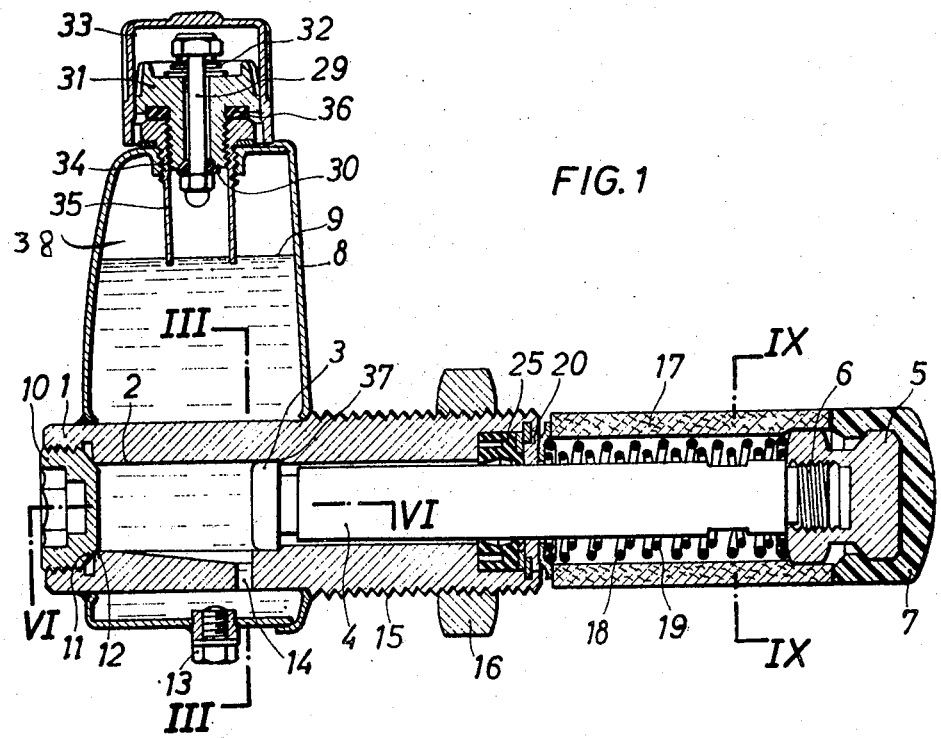
FIG. 1 is a complete longitudinal section through a hydraulic shock absorber for looms which incorporates the improvement of the present invention.
Figure 2:
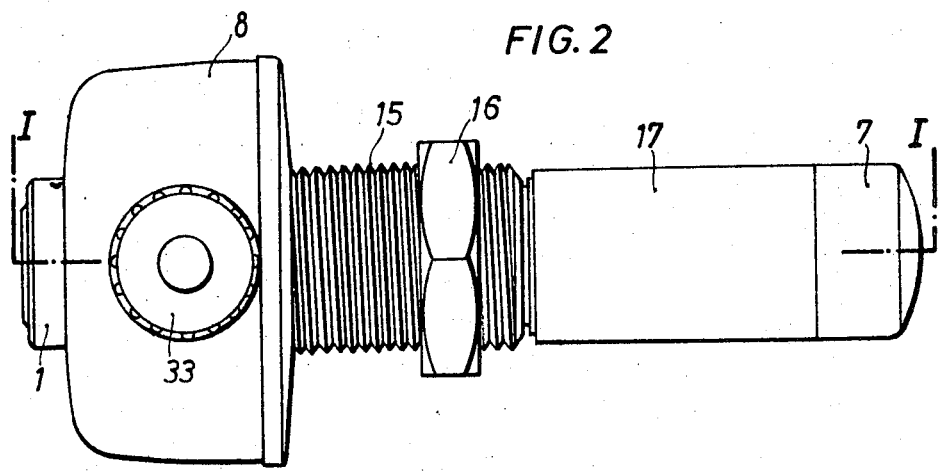
FIG. 2 is a plan view of the hydraulic shock absorber itself.
Figure 3:
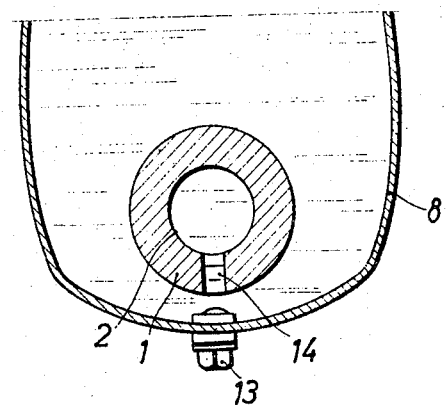
FIG. 3 is section taken along the lines III—III of FIG. 1.
Figure 6:
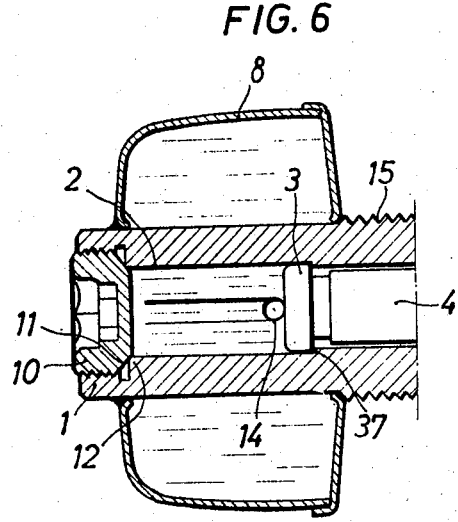
FIG. 6 is section taken along the lines VI—VI of FIG. 1.
Figure 9:
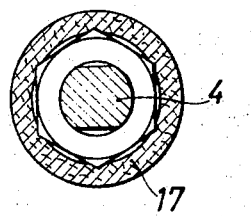
FIG. 9 is a section taken along the lines of FIG. 1.

Referring now to the drawings, the improvements which form the object of the present patent pertain to a hydraulic shock absorber comprising in general a cylindrical body comprising a hollow tubular element which has an inner orifice 2 which acts as a compression chamber for the head or position 3 of an oil compression rod 4 which bears at its end, by means of a part 5 threaded to the pin 6, an elastic cap 7 which indirectly receives the blow of the shuttle. A small inward protrusion 37 (FIG. 6) serves as an abutment stop for the head 3 of the rod 4.

The body 1, in accordance with the present invention, receives a tank 8 for the hydraulic fluid which is contained within the tank up to a given level 9. The two parts are connected by inserting the body 1 into a suitable opening in the tank 8 and then connecting the two by welding, thereby substantially simplifying the mounting and manufacture of the shock absorber.

The cylinder 1 bears at its end a threaded plug 10 for closing the chamber which contains the hydraulic oil, the plug 10 having a conical region 11 which coincides with an acute edge 12 of a shoulder of the cylinder itself, making a tight closure possible.

The tank 8 has at its outer part a threaded plug 13 which permits the draining of the hydraulic oil after a certain period of use.

The shock-absorbing effect is obtained when the head 3 of the rod 4 expels the hydraulic oil from the inside of the chamber towards the tank 8 through an orifice 14 arranged in the lower part of the body 1 itself, which permits the correct operation of the shock absorber with a much lower level of oil in the tank 8, since it is sufficient for the proper operation of the shock absorber that the amount of oil in the tank be sufficient to fill the compression chamber and the lower part of the tank 8. The orifice 14 serves as an outlet passage into the bottom of a groove having an inclined bottom which makes the braking effect gradual.

In order to permit the proper mounting or adjustment of the shock absorber on the loom, the body 1 has on its outside a threaded portion 15 on which there is provided a fastening nut 16 which makes it possible with great ease to adjust the longitudinal position of the shock absorber.

Figure 7:
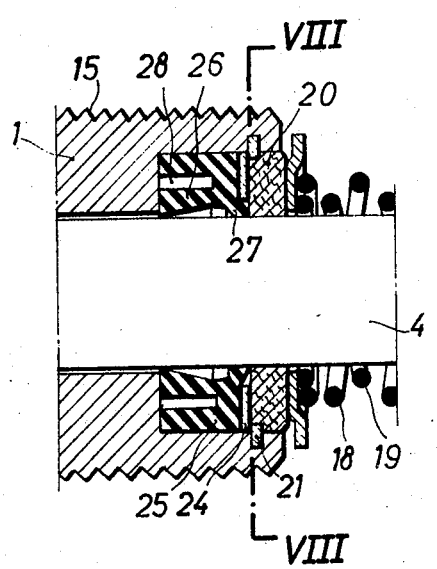
FIG. 7 is a longitudinal section of the closure zone shown on enlarged scale.
Figure 8:
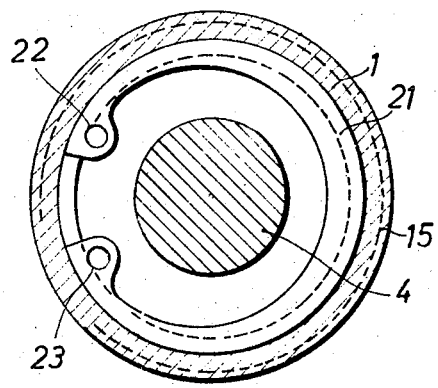
FIG. 8 is a section taken along the lines VIII—VIII of FIG. 7.

The present invention furthermore provides effective protection of the guide of the rod against the entrance of outside dirt, for which purpose a threefold protection is provided, namely, first of all a sleeve 17, preferably of polyurethane foam or another spongy-like elastic material, is held compressed between the end of the body 1 and the end of the elastic cap 7, closing the region therebetween in which there are mounted opposing springs 18 and 19, thus protecting this zone against the entrance of dirt from the outside. The second protection comprises, as illustrated in FIG. 7, a preferably felt ring 20 which is mounted on one end of the body 1 being housed therewithin and resting against a ring 21 of the type shown in FIG. 8 which can be removed through end holes 22 and 23. The felt ring 20 rests on a washer 24 which is in contact with a retainer 25, which acts as third protection and the main characteristic thereof consists in having two separate flanges 26 and 27, the first of which is limited on the top by a wide cylindrical groove 28 permitting a soft, effective action on the rod, while the second flange is directed at an acute angle towards the front, also exerting its action on the rod itself.

The hydraulic shock absorber comprises, in accordance with the present invention, a rod air-vent valve 29 and elastic closure ring 30, which coincides on the lower part of the plug 31, and an opposing spring 32 is provided about the valve 29 operatively connected thereto between the valve 29 and the plug 31. The valve 29 operates in a normal manner and is protected on the outside by a covering 33 preferably of synthetic material 33, which is fitted on the outside on the body 31 and which contacts the top of the body 8.

Figure 4:
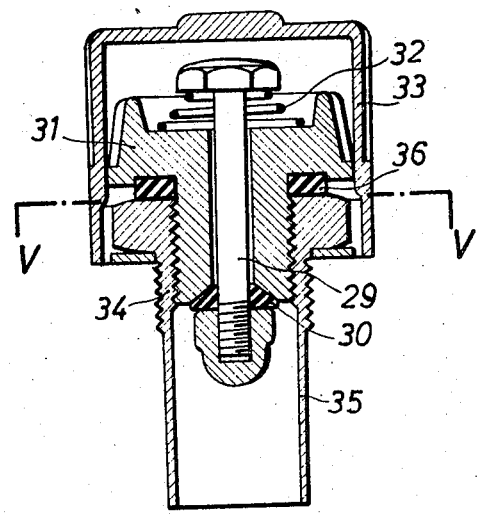
FIG. 4 is a longitudinal section of the air purge valve of the cylinder, shown on an enlarged scale.
Figure 5:
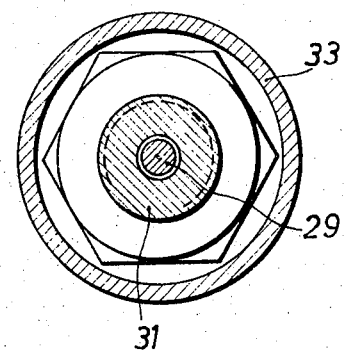
FIG. 5 is a section taken along the lines V—V of FIG. 4.

As may be noted from FIGS. 4 and 5, the closure valve comprises a lower collar 34 having a lower throat 35 screwed onto the lower portion of the plug 31. The lower throat of the collar 34 may extend into the oil in the tank 8 so that in all cases there is a larger air chamber 38 independently of the extent to which the tank is full. An intermediate washer 36 is provided between the plug 31 and the upper part of the collar 34.

By such construction of a hydraulic shock absorber for looms it is furthermore made possible for the braking work to be exercised exclusively by the passage of oil through the orifice 14 without the recovery springs having any action to this effect, the springs serving exclusively for returning the striking cap to the working position, which permits a reduced working of the springs, providing a greater dependability in operation and a resultant increase in life.

While I have disclosed one embodiment of the present invention, it is to be understood that this embodiment is given by example only and not in a limiting sense.

I claim:

1. A hydraulic shock absorber for looms, comprising a cylinder bearing body,
an oil compression rod slidably disposed within said cylinder bearing body,
an elastic cap mounted on one end of said rod and adapted to receive the impact of a shuttle,
an oil tank connected to said cylinder bearing body,
communicating channel means between said cylinder bearing body and said tank,
said cylinder bearing body comprising a hollow tubular element having an outer surface including a smooth portion,
said oil tank formed with an opening in which said smooth portion of said tubular element is inserted for connection to said oil tank,
said outer surface of said tubular element including a threaded portion for adjustable mounting on the loom, and
a conical end cap closing said hollow tubular element, the latter formed with a substantially inner right-angle step in which said conical end cap engages.

2. The hydraulic shock absorber, as set forth in claim 1, further comprising
a nut fastening said threaded portion.

3. The hydraulic shock absorber, as set forth in claim 1, wherein
said hollow tubular element constitutes an oil compressing cylinder, and
said communicating channel means is an orifice formed in the bottom of said tubular body communicating the interior of said hollow tubular element with said oil tank mounted on said element, thereby permitting operation of said shock absorber with a very low level of oil in said oil tank.

4. The hydraulic shock absorber, as set forth in claim 1, wherein
said oil compression rod extends at said one end beyond an end of said cylinder bearing body,
opposing springs mounted between said end of said cylinder bearing body and said elastic cap and disposed about said rod,
a sleeve of elastic material disposed completely surrounding said opposing springs,
a felt ring mounted at said end of said cylinder bearing body, and
a retainer mounted in said cylinder bearing body behind said felt ring, said retainer including two pressure flanges contacting said rod and directed opposite to each other.

* * * * *